Patented Aug. 7, 1934

1,968,882

UNITED STATES PATENT OFFICE 1,968,882

TREATMENT OF CELLULOSE ESTERS

Roderick K. Eskew, Rahway, N. J., assignor to Du Pont Viscoloid Company, Wilmington, Del., a corporation of Delaware No Drawing. Application December 2, 1930, Serial No. 499,532

13 Claims. (Cl. 260—148)

This invention relates to the purification, viscosity reduction, bleaching and clarification of cellulose esters, especially cellulose nitrate, and more particularly to these operations as carried out on nitrocellulose below 12.5% nitrogen content, as used in the lacquer and pyroxylin plastics industries.

It is well-known that nitrocellulose of approximately 12% nitrogen content and low viscosity is extensively used in lacquers and enamels for furniture and automobiles. This is possible because the property of low viscosity of the nitrocellulose permits it to be used in making solutions of high concentration but still sufficiently fluid to be sprayed or brushed. It is also true that the property of low viscosity in the case of nitrocellulose of approximately 11% nitrogen content is of importance in the manufacture of camphor-alcohol plastics, for example in the extrusion of rods and tubes. Furthermore, in safety glass manufacture it is of paramount importance to use nitrocellulose which has been purified so as to give a plastic as free as possible from haze, insoluble fibres and impurities which discolor on exposure to light.

The prior art of purification of nitrocellulose involved the boiling of the nitrocellulose in dilute spent nitrating acid, washing out the acid, and then bleaching if specially good color were desired. Low viscosity nitrocellulose has been made by nitrating at high temperatures with attendant low yields and high acid losses or as an alternative, digesting the nitrocellulose under pressure. This process of digestion is now used extensively, but it requires costly equipment and is a hazardous operation. Furthermore, it merely stabilizes and reduces the viscosity of the nitrocellulose, without bleaching it or improving the clarity of solutions or plastics made from it.

There are also methods of reducing nitrocellulose viscosity based on the principle of oxidation in aqueous medium, but these previous processes are by nature limited to temperatures below 100° C. and are designed to be operated at room temperature or slightly higher. For this reason they operate very slowly and are applicable only to nitrocellulose previously stabilized by heating in aqueous solution at approximately 100° C., or the products produced by these processes must be subsequently stabilized.

I have devised a process which permits of operating temperatures well above 100° C. even though at atmospheric pressure, thereby not only accelerating the viscosity-reducing action, but also accomplishing simultaneous stabilization of the nitrocellulose and other benefits to be hereinafter described, without the necessity of working under pressure. I have discovered that by heating the ester in a salt solution containing a soluble salt of a halogen acid, in the presence of a small quantity of acid, novel and unexpected results are obtainable in purification, viscosity reduction, bleaching and clarification. My invention is based on this discovery.

One object of my invention is to provide a rapid, simple and safe method of reducing the viscosity of cellulose esters in the undissolved state whether colloided or uncolloided, particularly cellulose nitrate. A further object is to purify the esters in their uncolloided state by removing the unesterified, e. g. unnitrated, and insufficiently esterified cellulose, so that solutions or plastics made from them will be of improved clarity. Another object is to bleach the product and a still further object is to provide a means for accomplishing these ends simultaneously with stabilization. To these ends and also to improve generally upon processes of the general character indicated, my invention consists in the various matters hereinafter described and claimed.

In general, in the preferable practice of the invention as applied to nitrocellulose, the nitrocellulose, nitrated in the usual way, is drowned in a large quantity of water according to the normal procedure in the industry. The dilute acid water is then drained off and the nitrocellulose is boiled in a concentrated salt solution containing a water-soluble salt of hydrochloric acid, such as sodium chloride or magnesium chloride, in the presence of a small quantity of acid, preferably nitric acid. At the completion of the treatment the nitrocellulose is washed free from the acid and salts. Without restriction of the invention thereto, and by way of example merely, procedure in accordance with the invention may be carried out as indicated next below, the example illustrating the process as preferably carried out in the manufacture of a low viscosity nitrocellulose containing approximately 11% nitrogen and having a viscosity of approximately 350 cps. (The nitrocellulose viscosities described herein are determined as follows: 20 grams of the dried nitrocellulose are dissolved in 313 grams of a solvent consisting of 30% camphor by weight in ethyl alcohol. The viscosity in centipoises equals 34 times the time in seconds required for $\frac{1}{8}''$ diameter aluminum sphere to fall through ten inches of the solution in a $1\frac{3}{8}''$ inside diameter tube at 25° C.) The nitrocellulose is nitrated in the usual manner to obtain a product of approximately 11.2% nitrogen, and, for reasons of economy, a high viscosity, say 3000 centipoises, and drowned in the usual manner in a large amount of water.

I

The acid water is drained off and a saturated water solution of sodium chloride is added in the proportion of 20 parts of brine, to 1 part of nitrocellulose. In addition, because of the water initially present in the drained nitrocellulose, enough dry sodium chloride is added to insure a saturated solution at the temperature of operation, approximately 109° C. The acidity of the brine is tested and enough mixed acid ($HNO_3$ and $H_2SO_4$) added to bring the acidity of the solution to 1% expressed as $H_2SO_4$. The mixture is boiled (b. p. about 109° C.) for 3 hours. The brine is then drained off (to a receptacle for re-use) and the nitrocellulose water-washed free from acids and chlorides.

The nitrocellulose, treated as above, has its viscosity reduced from its initial viscosity of about 3000 centipoises, to approximately 350 centipoises. Its nitrogen content will have dropped to approximately 11.0%. It will also have been bleached by the chlorine liberated during the boil and its stability by the methyl violet paper test at 134.5° C. will be at least 30 minutes. In addition, its solubility and clarity in camphor-alcohol mixtures commonly employed with this type nitrocellulose will be increased as a result of the process. This increase in solubility in alcohol and camphor-alcohol mixtures is illustrated by the following data, respecting a nitrocellulose (of 2000 cps.) treated in accordance with the above example except that the treatment was continued to 5½ hours. (The "2B alcohol" is U. S. Government formula denatured alcohol, 100 gallons alcohol plus ½ gallon benzol, page 6 of "Formulæ for completely and specially denatured alcohol" appendix to Regulation No. 3, formerly 61, revised June, 1930.)

| Time of boil | Viscosity of nitrocellulose | Solubility in 95% by vol. 2B ethyl alcohol | Solubility in 95% 2B alcohol —2% camphor | Solubility in 95% 2B alcohol —6% camphor |
|---|---|---|---|---|
| Hrs. | cps. | | | |
| 0 | 2000 | 25.44% | 57.21% | 72.09% |
| 1½ | 1055 | 39.93 | 77.88 | 88.60 |
| 2½ | 612 | 41.28 | 81.87 | Not tested. |
| 3½ | 286 | 53.13 | 86.12 | 90.80 |
| 5½ | 129 | 68.91 | Not tested. | 96.98 |

While, in the above example, a proportion of brine to nitrocellulose of 20 to 1 is mentioned, it will be understood that this liquid-to-solid ratio is not essential to the chemistry of the process, since any convenient ratio may be used, from, say 10 to 1 up to 30 to 1, or higher, governed largely by the type of equipment used in the handling of the mixture, the consideration being that there shall be sufficient brine to satisfactorily cover and permeate the nitrocellulose, and like operating factors. 20 to 1 is a convenient ratio where the type poacher or boiling tub commonly employed in nitrocellulose purification is used.

Sodium chloride is mentioned because of its cheapness; and crude rock salt may be used if the solution is filtered before use. However, any highly soluble, highly ionized, salt of hydrochloric acid will serve, the chlorides of any of the alkali metals and of any of the alkaline earth metals being preferable. As will be understood by those skilled in the art, if it is desired to prepare a product unclouded by insoluble salts, the use of the chlorides of metals whose sulphates are objectionably insoluble, should be avoided, when treating nitrocellulose which has not been pretreated to remove sulphuric acid esters, or when using sulphuric acid in the performance of the process.

The use of sulphuric acid in the re-agent acid, although not essential is desirable in that it contributes to the acidity, and therefore the hydrolyzing action of the bath, without increasing the oxidizing action. When nitric acid alone is used it is difficult to maintain sufficient acidity without producing too powerful an oxidizing condition. 2% nitric acid, for example, will cause in a short time the complete decomposition of some types of nitrocellulose, e. g. those of approximately 11% or less nitrogen content, when boiled in a saturated brine solution. With some nitrocelluloses of higher nitrogen content, e. g. 12% nitrogen, it is sometimes permissible and feasible to use nitric acid alone. While sulphuric acid is more particularly mentioned for use with nitric acid as the non-oxidizing hydrolyzing acid in this process, because of its low cost, availability, etc., it will be understood that other non-oxidizing acids can be used. Furthermore, sulphuric or any other non-oxidizing acid may be used alone, i. e. in the absence of an added oxidizing acid, since the non-oxidizing acid hydrolyses the nitrocellulose and thereby liberates nitric acid, thus supplying oxidizing acid.

I do not limit myself to 1% acidity as either a greater or lesser acidity may be used depending upon the degree of viscosity reduction desired. Too low a concentration lessens both the bleaching and viscosity-reducing actions and too high a concentration disintegrates the nitrocellulose excessively. The maximum should be not greater than 5% mixed acid expressed as $H_2SO_4$. By mixed acid I mean the type commonly consisting of approximately 20% $HNO_3$, 60% $H_2SO_4$, and 20% water. Any acid, sufficiently ionized under the conditions of the process to produce hydrolysis of the nitrocellulose, may be used, but I prefer mixed acid because of its availability and the fact that it is a mixture of an oxidizing acid as explained below, and a non-oxidizing acid.

Neither do I limit myself to the type of nitrocellulose mentioned in the example as the principle of the process is equally applicable to more highly nitrated nitrocellulose such as the so-called 12% nitrogen pyroxylin, the very low viscosity types of which are extensively employed in the automobile and wood lacquer industries and which are now being made by the hazardous pressure-digestion method. It is known that these high nitrogen types are difficult to stabilize and are less sensitive to viscosity reduction. The process as practiced in the example is applicable to the more highly nitrated nitrocellulose e. g. 12% nitrogen but a longer time of boiling, higher acid concentrations and salts other than the one cited in the example may be preferable.

Further examples of the practice of the process are:—

II

The nitrocellulose was of approximately 11% nitrogen, and an initial viscosity of 1926 cps. Procedure was in general accordance with Example I, except that to the saturated sodium chloride solution was added sufficient mixed acid to bring the acidity to .44% expressed as $H_2SO_4$, and the time of boiling was 4 hours. Final viscosity 623 cps.; stability at 134.5° C., 30 min.; solutions of the treated nitrocellulose in camphor-alcohol were bright, clear and of good color.

III

The nitrocellulose, and the treatment, were the same as in Example II except that the acidity of the brine was 1.81%. Final viscosity 50 cps.; stability at 134.5° C., 40 min.; other characteristics the same as those of the product of Example II.

IV

The nitrocellulose of approximately 11% nitrogen, and an initial viscosity of 694 cps. was treated as in Example I. A sample at the end of one hour had a viscosity of 204 cps. and at the end of the three hours a viscosity of 82 cps.

IV$^A$

The nitrocellulose, and treatment, were the same as in Example IV, except that at the beginning of the treatment triacetin was substituted for 10% (by volume) of the acid-brine solution; at the end of one hour the viscosity was 34 cps., and was 26 cps. at the end of the three hours.

V

Scrap transparent cellulose nitrate plastic (i. e. a cellulosic nitrate product of about, parts by weight, colloided nitrocellulose (approximately 11% nitrogen) 100, camphor 34, ethyl alcohol 2,) cut into small pieces, was treated, except for length of time, as the uncolloided nitrocellulose, in Example I. The initial viscosity of the nitrocellulose in the plastic was 660 cps.; at the end of one hour the viscosity was 476 cps.; after two and one-half hours, 381 cps.; and after five hours 204 cps.

VI

This was the same as V except the acidity of the brine was 2% instead of 1%. Viscosity after one hour, 476 cps.; after two and one-half hours, 245 cps.; and after five hours, 68 cps.

I may say in connection with Examples II and III the boiling was continued on a part of the sample beyond 4 hours and up to 6 hours with the result that in II the viscosity was reduced to 282 cps. and in III was so far reduced that it could not be determined by the ordinary method.

It will be seen that Example IV$^A$ illustrates the use of a penetrant, e. g. triacetin; and in comparison with Example IV exhibits the advantage in the use of a penetrant. Various other penetrants, i. e. substances which have a solvent or plasticizing effect on the cellulose ester, could of course be used. Examples V and VI illustrate the application of the process to the reduction of the viscosity of a colloided cellulose ester.

While I do not base the invention on, or confine it to, any particular explanation of the reason for the rapid and highly satisfactory decrease in viscosity accomplished by the process, it at present appears to me probable that the efficiency of the process may be explained, at least in part, by the following considerations:— A powerful oxidizing condition arises from the chlorine liberated by the action of the HNO$_3$ on the chloride ion which is greatly accelerated by the elevated temperature (109° C. in the example above) existing in the bath as well as by the high concentration of the chloride ion, and furthermore the chloride ion concentration remains essentially the same throughout the treatment. Also, as the viscosity reduction proceeds HNO$_3$ is liberated as a result of the hydrolysis of the nitrocellulose, thus further increasing the hydrolysing and oxidizing actions. This appears to account for the continued and progressive action characteristic of my process.

The salt in the solution raises the boiling point of the bath. In cases wherein dependence is primarily placed on mere hydrolysis, a boiling point raiser other than a salt of a halogen acid can be used if desired, such as water-soluble salts of other acids and many other materials.

Although the use of a saturated salt solution, the use of but one salt, a specified time, and operation at the boiling point of the solution have been more particularly referred to, it will be understood that these, and other factors, may be varied without departure from the spirit of the invention. For example, a salt solution of any degree of concentration may be used, a mixture of salts of hydrochloric acid, or indeed a salt mixture including as well as a salt of hydrochloric acid, a salt or salts other than salts of hydrochloric acid may be used, the time may be varied in consideration of the degree of viscosity desired, the greater the time the greater the reduction other factors remaining constant, and the operations may be conducted at below the boiling point. Of course, solutions, even though dilute, retain the advantages incident to the use of a source of halide ions, and therefore the use of such solutions may at times be advisable; yet the more dilute the solution the less the effect of the salt as a raiser of the boiling point. As will be understood, the reduction of the viscosity of nitrocelluloses of the higher nitrogen contents, is more difficult than the reduction of the viscosity of nitrocelluloses lower in nitrogen content, so that it will be further advisable to vary various of the factors, as the time of treatment, the temperature of operations, etc., in consideration of the nitrogen content of the particular cellulose nitrate under treatment.

Whereas in the recital of the above examples, no mention of mechanical agitation, circulation of the liquid, or other particular procedure for securing uniformity of conditions throughout the mass, is made, since the agitation incident to ebullition was adequate, it will be understood that any suitable method of securing adequate uniformity may be resorted to. The fluffy condition of uncolloided nitrocellulose, as used in Examples I to IV$^A$ inclusive and the chipped condition of the colloided nitrocellulose, as used in Examples V and VI readily lend themselves to the securing of uniform conditions.

While the treatment of cellulose nitrate has been particularly referred to, it will be understood that the invention, in certain of its aspects, may find application in the treatment of other cellulose esters, as cellulose acetate. Also, although the salts of hydrochloric acid have been particularly considered, salts of other halogen acids, as hydrobromic acid, may be desirable for use in certain cases.

To review certain advantages of the invention:—

1. The process gives a nitrocellulose of low viscosity without nitrating at high temperatures with the attendant low yield and acid losses and without the hazardous operation of pressure digestion.

2. It enables carrying out simultaneously the operations of stabilizing and of reducing viscosity ordinarily done by pressure digestion.

3. It permits of bleaching simultaneously with stabilization and viscosity reduction.

4. It shortens the time of boil normally required for stabilization at atmospheric pressures because the temperature is elevated above 100° C. by the use of concentrated salt solutions.

5. It produces a product lowered in viscosity to any desired extent depending upon the time of boil and concentration of acid and salt; also one which is thoroughly bleached and which gives solutions of improved clarity, as a result of the removal of insoluble material.

6. It removes unnitrated fiber to a large degree from the nitrocellulose. It is these unnitrated fibers which contribute the objectionable flecks of so-called "star dust" in safety glass, and are also partly responsible for its haziness.

7. It greatly increases the solubility of the nitrocellulose in ethyl alcohol.

Not only does the present process have the various advantages indicated above but also nitrocellulose with its viscosity reduced by the present process is improved in initial color and instead of having a greater sensitivity to light possesses an improved light resistance. This is of particular importance in the safety glass industry wherein nitrocellulose compositions are used in the glass-binder-glass "sandwich". In safety glass, improved resistance to discoloration by light is of obvious significance, and also it is important to use bleached nitrocellulose; yet when nitrocellulose is bleached by any of the ordinary methods, as with chlorine or hypochlorites, the benefits of improved color are frequently lost through the tendency of the plastics made from such nitrocellulose to discolor more rapidly on exposure to light than plastics made from the unbleached nitrocellulose.

In contrast to this difficulty, a safety glass automobile windshield embodying cellulose nitrate treated by the present process will, in comparison with one embodying cellulose nitrate bleached in the usual ways, have less color at the end of a given period of use both because of better initial color and because of reduced tendency to develop color.

I claim:

1. The process of reducing the viscosity characteristic of cellulose nitrate which comprises subjecting the nitrate in the undissolved state and in an aqueous medium to the action of an acid of such a character and in such amount as to hydrolyze the nitrate, the treatment being in the presence of a salt of a member of the arbitrary group composed of the alkali metals and the alkaline earth metals, and of a halogen acid of the group composed of hydrochloric acid and hydrobromic acid.

2. The process of treating nitrocellulose which comprises introducing the nitrocellulose in the undissolved state into a water solution of a salt of a member of the arbitrary group composed of the alkali metals and the alkaline earth metals, and of a halogen acid of the group composed of hydrochloric acid and hydrobromic acid, adding acid in such amount as to hydrolyze the nitrate to the bath, and heating.

3. The process of treating cellulose nitrate which comprises subjecting the nitrate in the undissolved state and in an aqueous medium to the action of nitric acid and in the presence of a salt of a member of the arbitrary group composed of the alkali metals and the alkaline earth metals, and of a halogen acid of the group composed of hydrochloric acid and hydrobromic acid.

4. The process of treating cellulose nitrate which comprises subjecting the nitrate in the undissolved state and in an aqueous medium to the action of nitric acid and in the presence of a salt of a member of the arbitrary group composed of the alkali metals and the alkaline earth metals, and of a halogen acid of the group composed of hydrochloric acid and hydrobromic acid, at a temperature above 100° C and at atmospheric pressure.

5. The process of treating cellulose nitrate which comprises subjecting the nitrate in the undissolved state and in an aqueous medium to the action of nitric acid in the presence of sodium chloride.

6. The process of treating cellulose nitrate which comprises subjecting the nitrate in the undissolved state and in an aqueous medium to the action of sulphuric acid, and in the presence of a salt of a member of the arbitrary group composed of the alkali metals and the alkaline earth metals, and of a halogen acid of the group composed of hydrochloric acid and hydrobromic acid.

7. The process of treating cellulose nitrate which comprises heating the nitrate in the undissolved state in an aqueous medium containing sulphuric acid, and in the presence of a salt of a member of the arbitrary group composed of the alkali metals and the alkaline earth metals, and of a halogen acid of the group composed of hydrochloric acid and hydrobromic acid, at a temperature above 100° C. and at atmospheric pressure.

8. The process of treating cellulose nitrate which comprises subjecting the nitrate in the undissolved state and in an aqueous medium to the action of a mixture of nitric and sulphuric acids, in the presence of a salt of a member of the arbitrary group composed of the alkali metals and the alkaline earth metals, and of a halogen acid of the group composed of hydrochloric acid and hydrobromic acid.

9. The process of treating cellulose nitrate which comprises subjecting the nitrate in the undissolved state and in an aqueous medium to the action of a mixture of nitric and sulphuric acids and in the presence of a salt of a member of the arbitrary group composed of the alkali metals and the alkaline earth metals, and of a halogen acid of the group composed of hydrochloric acid and hydrobromic acid, at a temperature above 100° C. and at atmospheric pressure.

10. The process of treating cellulose nitrate which comprises subjecting the nitrate in the undissolved state and in an aqueous medium to the action of a mixture of nitric and sulphuric acids, in the presence of sodium chloride.

11. The process of treating cellulose nitrate which comprises subjecting the nitrate in the undissolved state and in an aqueous medium to the action of a mixture of nitric and sulphuric acids, in the presence of a saturated solution of sodium chloride.

12. The process of reducing the viscosity of nitrocellulose which process comprises, introducing the nitrocellulose in the undissolved state into a concentrated water solution of sodium chloride, adding a small amount of sulphuric and nitric acids, and boiling.

13. The process of treating a cellulose nitrate which comprises subjecting said ester in the undissolved state and in an aqueous medium, to the action of nitric acid, in the presence of a substance itself inert with respect to the ester, serving to raise the boiling point of the medium, and at a temperature above 100° C. and at atmospheric pressure.

RODERICK K. ESKEW.